United States Patent
Karp et al.

(10) Patent No.: US 12,286,711 B2
(45) Date of Patent: Apr. 29, 2025

(54) USE OF INTERMEDIATES IN SOLAR FUELS GENERATION

(71) Applicant: California Institute of Technology, Pasadena, CA (US)

(72) Inventors: Christoph D. Karp, Pasadena, CA (US); Alec S. Ho, Pasadena, CA (US); Xinghao Zhou, Pasadena, CA (US); Chengxiang Xiang, San Marino, CA (US); Nathan S Lewis, La Canada Flintridge, CA (US)

(73) Assignee: California Institute of Technology, Pasadena, CA (US)

( * ) Notice: Subject to any disclaimer, the term of this patent is extended or adjusted under 35 U.S.C. 154(b) by 361 days.

(21) Appl. No.: 16/286,467

(22) Filed: Feb. 26, 2019

(65) Prior Publication Data

US 2019/0264338 A1 Aug. 29, 2019

Related U.S. Application Data

(60) Provisional application No. 62/635,776, filed on Feb. 27, 2018.

(51) Int. Cl.
| | |
|---|---|
| *C25B 1/04* | (2021.01) |
| *C01B 3/06* | (2006.01) |
| *C25B 1/55* | (2021.01) |
| *C25B 9/05* | (2021.01) |
| *C25B 9/19* | (2021.01) |
| *C25B 9/73* | (2021.01) |

(Continued)

(52) U.S. Cl.
CPC ............... *C25B 1/04* (2013.01); *C01B 3/06* (2013.01); *C25B 1/55* (2021.01); *C25B 9/05* (2021.01); *C25B 9/19* (2021.01); *C25B 9/73* (2021.01); *C25B 15/08* (2013.01); *H01M 8/0606* (2013.01)

(58) Field of Classification Search
CPC .... C25B 1/04; C25B 1/55; C25B 9/05; C25B 9/19; C25B 9/73; C25B 15/08; C01B 3/06; C01B 3/08; H01M 8/0625; H01M 8/0631; Y02E 60/36
See application file for complete search history.

(56) References Cited

U.S. PATENT DOCUMENTS

| | | | | |
|---|---|---|---|---|
| 4,169,030 | A | * | 9/1979 | Gray ............... B01J 19/127 204/157.75 |
| 6,143,443 | A | * | 11/2000 | Kazacos ............... H01M 10/36 429/188 |
| 9,543,609 | B2 | * | 1/2017 | Amstutz ............. H01M 8/0656 |

(Continued)

OTHER PUBLICATIONS

Mcdonald, M.B., Ardo, S., Lewis, N.S. and Freund, M.S. (2014), Use of Bipolar Membranes for Maintaining Steady-State pH Gradients in Membrane-Supported, Solar-Driven Water Splitting. ChemSusChem, 7: 3021-3027. (Year: 2014).*

(Continued)

*Primary Examiner* — Luan V Van
*Assistant Examiner* — Mofoluwaso S Jebutu
(74) *Attorney, Agent, or Firm* — Gavrilovich, Dodd & Lindsey LLP

(57) ABSTRACT

A solar fuels generation system includes a first reactor that contains a first solution in which a charge carrier is reduced to a reduced charge carrier. The system also includes a second reactor that contains a second solution in which the reduced charge carrier reduces protons so as to generate hydrogen gas.

17 Claims, 5 Drawing Sheets

(51) Int. Cl.
*C25B 15/08* (2006.01)
*H01M 8/0606* (2016.01)

(56) References Cited

U.S. PATENT DOCUMENTS

| | | | | |
|---|---|---|---|---|
| 2003/0141200 | A1* | 7/2003 | Harada | C25B 15/02 |
| | | | | 205/637 |
| 2012/0216854 | A1* | 8/2012 | Chidsey | C25B 1/55 |
| | | | | 136/248 |
| 2016/0376712 | A1* | 12/2016 | Ono | C25B 9/19 |
| | | | | 204/230.5 |
| 2017/0297913 | A1* | 10/2017 | Cronin | C25B 9/73 |
| 2018/0269516 | A1* | 9/2018 | Wang | H01M 8/04925 |

OTHER PUBLICATIONS

Clark, Jim, Chemistry of Vanadium, Truro School in Cornwall, Aug. 21, 2020 (Year: 2020).*

Niall Kirkaldy, Greig Chisholm, Jia-Jia Chen and Leroy Cronin "A practical, organic-mediated, hybrid electrolyser that decouples hydrogen production at high current densities", Chem. Sci., 2018,9, 1621-1626 (Year: 2018).*

* cited by examiner

USE OF INTERMEDIATES IN SOLAR FUELS GENERATION

CROSS REFERENCE TO RELATED APPLICATIONS

This Application claims the benefit of U.S. Provisional Patent Application Ser. No. 62/635,776, filed on Feb. 27, 2018, and incorporated herein in its entirety.

STATEMENT REGARDING FEDERALLY SPONSORED RESEARCH

This invention was made with government support under Grant No. DE-5C0004993 awarded by the Department of Energy. The government has certain rights in the invention.

FIELD OF THE INVENTION

The invention relates to generation of solar fuels, and more particularly, to use of intermediates in the generation of solar fuels.

BACKGROUND

Hydrogen gas is a promising alternative to traditional fuels, because it is abundant, carbon-free, and has a high energy density. Solar-driven water hydrolysis is one method that has been proposed for generating hydrogen gas. However, water hydrolysis often generates both oxygen and hydrogen gas in the same location presenting potentially dangerous conditions. Additionally, since solar-driven water hydrolysis is limited to sunny conditions, the hydrogen gas is not always available on demand. As a result, hydrogen from solar-driven water hydrolysis is stored in order to make the hydrogen continuously available. Further, the hydrogen from solar-driven water hydrolysis is a gas that is pressurized for effective storage. This pressurization adds complexity and costs to the process. As a result, there is a need for an improved solar fuels generation system.

SUMMARY

A solar fuels generation system includes a first reactor that contains a first solution in which a charge carrier is reduced to a reduced charge carrier. The system also includes a second reactor that contains a second solution in which the reduced charge carrier reduces protons so as to generate hydrogen gas.

A solar fuel intermediate generator includes a bias source that includes one or more components selected from a photoelectrode, a solar cell, and a photovoltaic cell. The generator also includes a catholyte in which a charge carrier is reduced to a reduced charge carrier by electrons excited as a result of absorption of light by the bias source. The charge carrier and the reduced charge carrier are a redox couple having a redox potential that is more negative than a hydrogen evolution potential for the reduced charge carrier reducing to protons to hydrogen gas in the catholyte.

A method of generating hydrogen gas includes reducing a charge carrier to a reduced charge carrier in a first reactor. The method also includes the reduced charge carrier reducing protons in a second reactor so as to generate the hydrogen gas. In some instances, solar energy is used to excite the electrons that reduce the charge carrier to the reduced charge carrier in the first reactor.

DESCRIPTION

Figure 1:
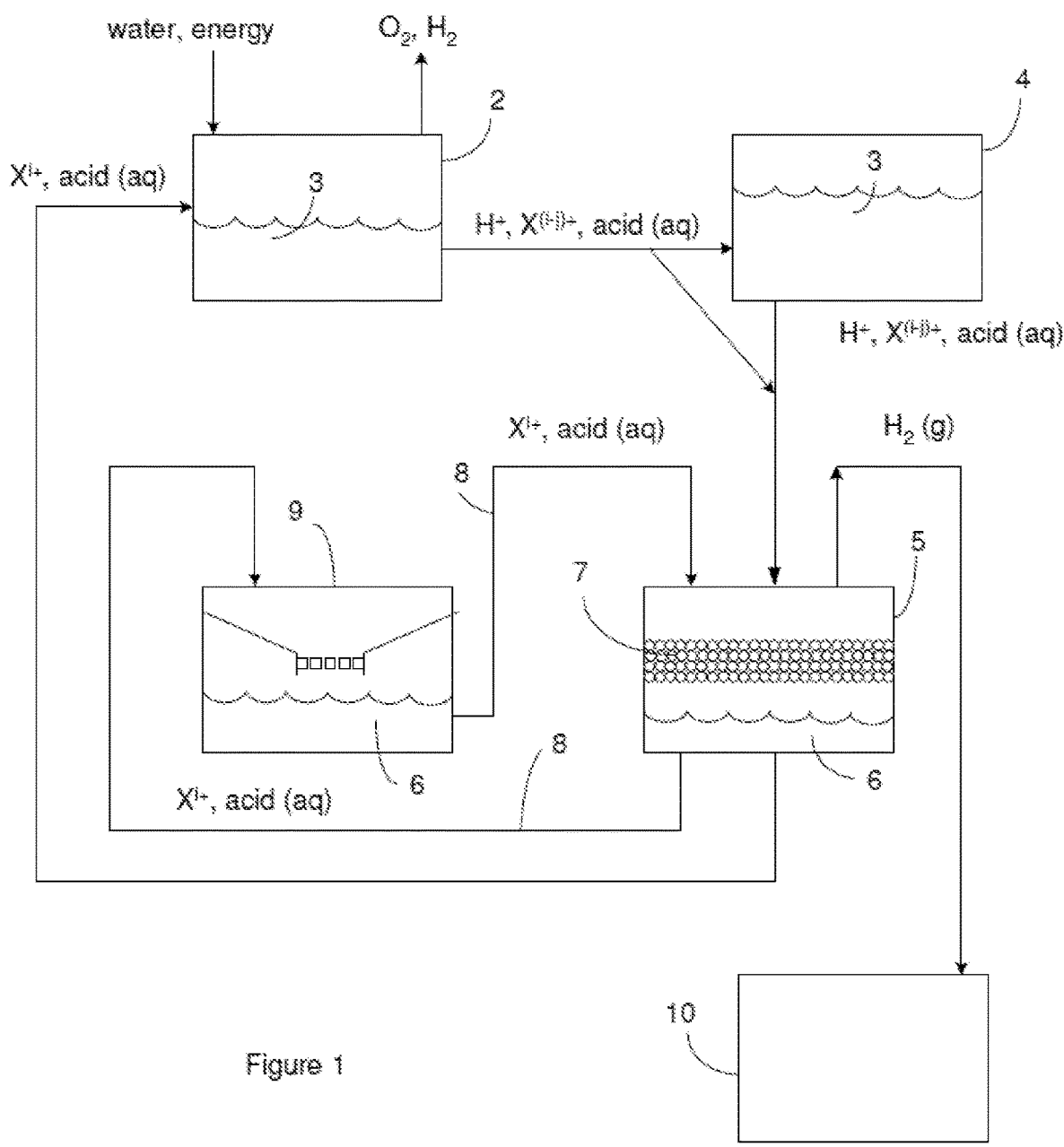
FIG. 1 is a schematic of a system that uses an intermediate to generate fuel.

As used herein and in the appended claims, the singular forms "a," "an," and "the" include plural referents unless the context clearly dictates otherwise. Thus, for example, reference to "a reactor" includes a plurality of reactors and reference to "the interface" includes reference to one or more interfaces and equivalents thereof known to those skilled in the art, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. Moreover, with respect to any term that is presented in one or more publications that is similar to, or identical with, a term that has been expressly defined in this disclosure, the definition of the term as expressly provided in this disclosure will control in all respects.

Also, the use of "and" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

A system for generating gaseous fuels such as hydrogen makes use of an intermediate that can be stored in a liquid form. For instance, the system can reduce a charge carrier to a reduced charge carrier in a first solution. The system can subsequently use the reduced charge carrier to reduce protons so as to produce hydrogen gas for fuel. The proton reduction can also return the reduced charge carrier back to the original charge carrier. The recovered charge carrier can then be re-used to generate additional hydrogen gas. Accordingly, the charge carrier can be recovered from the hydrogen gas generation process and re-used.

The first solution can be a liquid that can be stored between reducing the charge carrier and reducing the protons. The first solution can be used to generate the hydrogen gas at any time. As a result, the generation of hydrogen gas is not dependent on sunlight. Further, the charge carrier can be reduced in a solar fuels generator that generates oxygen gas in addition to generating the first solution. Since the charge carrier reduction and the proton reduction can be separated in time and/or in location, oxygen and hydrogen gas need not be generated concurrently in the same location. This ability to decouple oxygen generation from hydrogen generation improves the safety of the hydrogen generation system. Additionally, in some instances, the proton reduction reaction can be performed under elevated pressures. As a result, the proton reduction can be performed in a pressurized reactor. The ability to generate the hydrogen in a pressurized reactor can remove the need to pressurize hydrogen gas in an extra step and can accordingly reduce the cost and complexity of hydrogen generation.

FIG. 1 illustrates a solar fuels generation system. The solar fuels generation system includes a first reactor 2. During operation of the system, the first reactor 2 receives energy, water, one or more acids, and a charge carrier. When the first reactor 2 is a batch reactor, the acid can be included in the water received by the reactor. When the first reactor 2 is a continuous reactor, the water can be delivered into the first reactor 2 in addition to the aqueous acid and/or can be mixed with the aqueous acid before delivery of the aqueous acid into the first reactor 2.

In FIG. 1, the charge carrier is labeled $X^{i+}$ where X can represent an atom or a compound, and i+ represents the charge of X where i is an integer and is greater than or equal to 1 and less than or equal to 1. Examples of suitable X include, but are not limited to V, Zn, and Cr.

The first reactor 2 contains a first solution 3 that includes the water, acid, and the charge carrier. During operation of the first reactor 2, the energy is applied to the first reactor 2 so as to reduce the charge carrier and generate protons in the first solution 3. The reduction of the charge carrier reduces the charge carrier to $X^{(i-j)+}$ and generates a first solution 3 where j is an integer and can be 1, 2, 3, or 4 and (i–j) is greater than 0. Oxygen is also generated in the first reactor 2. The water in the first reactor 2 can be a source of electrons that reduce the charge carrier and the source of the oxygen in the oxygen gas. The water can also be the source of the protons in the first solution 3 and/or the acid can be the source of the protons in the first solution 3. The first solution 3 includes the reduced charge carrier ($X^{(i-j)+}$), the protons and the aqueous acid. The oxygen can be left in a gaseous atmosphere that contacts the first solution 3 and/or can be removed from the first reactor 2 by venting, or scrubbing.

A suitable pH for the first solution 3 includes a pH greater than or equal to −1, 0, or 1 and/or less than 14, 13, or 12. At lower pH levels, the protons generated in the first reactor 2 do not substantially affect the pH of the first solution 3. Suitable acids for use in the first solution 3 include, but are not limited to, $H_2SO_4$, HCl, and $HNO_3$ As illustrated in FIG. 1, the first reactor 2 can also generates hydrogen gas. The hydrogen gas can be generated as a result of the Hydrogen Evolution Reaction (HER) and can be considered a parasitic reaction. The hydrogen gas can be left in the gaseous atmosphere that contacts the first solution 3 and/or can be removed from the first reactor 2 by venting and/or scrubbing. In some instances, the conditions in the first reactor 2 are selected to suppress the rate of Hydrogen Evolution Reaction (HER) relative to the rate of charge carrier reduction. For instance, materials used in the first reactor 2 can be selected to have slow reaction kinetics for the HER and/or fast kinetics for the desired charge carrier reduction. In some instances, the conditions in the first reactor 2 are configured such that the rate of charge carrier reduction:rate of the Hydrogen Evolution Reaction (HER) is greater than 1000:1, 100:1, or 10:1.

The first solution 3 can be stored in the first reactor 2. Alternately, the system can optionally include a storage vessel 4 where the first solution 3 can be stored. In some instances, the first solution 3 is transported from the first reactor 2 to the storage vessel 4.

The first solution 3 can be transported from the first reactor 2 and/or the storage vessel 4 to a second reactor 5. The second reactor 5 can be configured such that the reduced charge carrier ($X^{(i-j)+}$) in the first solution 3 reduces the protons in the first solution 3 so as to generate a second solution 6 contained in the second reactor 5 and hydrogen gas. The reaction can be a proton reduction reaction. For instance, the reduced charge carrier ($X^{(i-j)+}$) can reduce the protons to hydrogen gas. As a result, the second reactor 5 can contain a second solution 6 where the reduced charge carrier ($X^{(i-j)+}$) is oxidized back to the charge carrier ($X^{i+}$). The second solution 6 includes the charge carrier ($X^{i+}$) and the aqueous acid. The hydrogen gas can be present in a headspace above the second solution 6 and/or transported from the second reaction 5.

In some instances, the second reactor 5 includes a catalyst 7 that catalyzes the reduction of the protons to hydrogen. Accordingly, the second reactor 5 can be configured to contact the first solution 3 with the catalyst 7 so as to form the second solution 6 and generate the hydrogen gas. In some instances, the catalyst 7 is in the form of powder particles, particles, granules, beads, and/or pellets. Accordingly, the second reactor can include the catalyst 7 in a catalyst bed. As a result, suitable second reactors include, but are not limited to, packed bed reactors, catalytic reactors, fixed bed reactors, micro-fluidic reactors, and flow field reactors.

In some instances, the system can include a re-circulation mechanism 8 that transports second solution 6 that has passed through the catalyst 7 back through the catalyst 7 one or more times. For instance, the re-circulation mechanism 8 can remove the second solution 6 that has passed through the catalyst 7 from the second reactor 5 and transport the removed second solution 6 back into the second reactor 5 at a location that is before the catalyst 7. As a result, the re-circulation mechanism 8 can extend the contact time between the catalyst 7 and the first solution 3 and/or the second solution 6.

In some instances, the re-circulation mechanism 8 includes a solid removal component 9 configured to reduce the solid content of the second solution 6. Suitable solid removal components include, but are not limited to, filtration components, and centrifuge components. The second solution 6 can be transported from the second reactor 5 to the solid removal component 9 for removal of solids from the second solution 6. The re-circulation mechanism 8 can return the resulting second solution 6 to the second reactor 5.

The hydrogen gas generated in the second reactor 5 can be collected and transported to an application 10. In some instances, the application 10 is storage. As a result, the hydrogen gas can be transported to a hydrogen storage vessel such as a tank. Other examples of suitable applications for the hydrogen gas include, but are not limited to, combustion in an engine, fuels in a fuel cell, feedstock in bio-upgrading and metal refining. In some instances, the proton reduction reaction can occur at rates that allow the hydrogen gas to be generated on an as-needed basis. As a result, the liquid first solution 3 need not be converted to hydrogen gas by the proton reduction reaction until the application 10 needs and/or requests the hydrogen gas. In response to the application 10 needing and/or requesting the hydrogen gas, the liquid first solution 3 can be transported into the second reactor 5 so as to generate the hydrogen gas and the generated gas can be transported to the application 10. For instance, the system can include electronics (not shown) that operate system components such as pumps, and/or valves so as transport the liquid first solution 3 into the second reactor 5 in response to the application 10 needing and/or requesting the hydrogen gas. In these instances, the system can optionally include an open fluid pathway from the second reactor to the application and/or the electronics can operate the system components so as to create an open fluid pathway from the second reactor to the application allowing the generation of the hydrogen gas in the second reactor to drive hydrogen gas to the application for use by the application.

The second reactor 5 can be pressurized. In some instances, the proton reduction reaction can occur at elevated pressure levels. Pressurizing the second reactor 5 allows the hydrogen gas to be transported to the application 10 at the pressure of the second reactor 5. Accordingly, for storage, the hydrogen gas can be stored at pressures at or near the pressure of the second reactor 5 without the requirement for additional pressurization. In these instances, there is no need for the additional hydrogen pressurization step associated with typical hydrogen production. Suitable pressures for the second reactor 5 include, but are not limited to, pressures greater than 1.5 bar, 10 bar, 100 bar, or 1000 bar and/or less than 1000 bar, 100 bar, or 15 bar.

The second solution 6 can be transported from the second reactor 5 to the first reactor 2 where it can be included in another first solution 3. The second solution 6 transported from the second reactor 5 includes the acid, the charge carrier and may include reduced charge carrier. Since the system can return the charge carrier and the acid to the first reactor 2, the system need not consume large amounts of the charge carrier and/or the acid.

Figure 2:
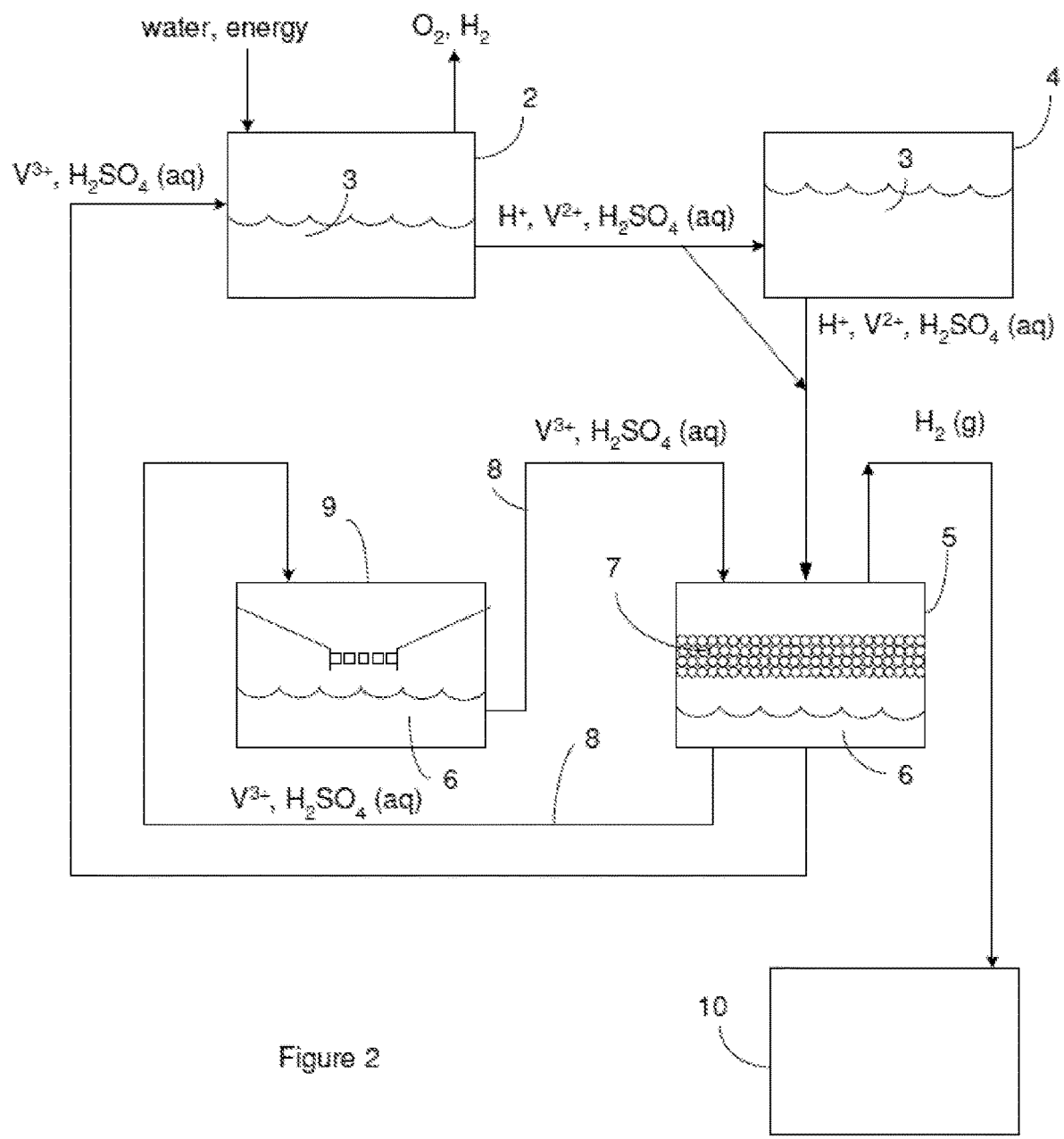
FIG. 2 is the schematic of FIG. 1 using vanadium cations as a charge carrier and as a reduced charge carrier.

In one example, $X^{i+}$ represents $V^{3+}$. FIG. 2 illustrates the system of FIG. 1 with $V^{3+}$ as the charge carrier. The $V^{3+}$ is reduced to the reduced charge carrier ($V^{2+}$) in the first reactor 2. The reduced charge carrier ($V^{2+}$) is oxidized back to the charge carrier ($V^{3+}$) in the second reactor 5 and hydrogen gas is produced. The oxidation of the reduced charge carrier and hydrogen gas generation can be according to the following reaction 1: $2H^+ + 2V^{2+} \rightarrow H_2(g) + 2V^{3+}$. Reaction 1 generally has a Hydrogen Evolution Potential in the range of 50 mV to 400 mV in different first solutions. The catalyst 7 for the reaction can be any catalysts that facilitate the HER chemically, such as a solid molybdenum-carbide based catalyst, $Mo_2C$ or Pt.

The vanadium redox couple is soluble in acidic conditions. Accordingly, a suitable pH for the first solution 3 includes a pH greater than or equal to -1, 0, or 1 and/or less than 2, 1, 0, or -0.5. Suitable acids for use in the first solution 3 of FIG. 2 include, but are not limited to, $H_2SO_4$, HCl, and $HNO_3$.

Suitable charge carriers provide a reduced charge carrier ($X^{(i-j)+}$) that can reduce the protons in the second reactor 5 to produce $H_2(g)$. As a result, the redox potential for the charge carrier redox couple ($X^{i+}/X^{(i-j)+}$) is less (more negative) than the hydrogen evolution potential in the first solution 3 and/or in the second solution 6. Additionally, the pressure level to which the second reactor 5 can be pressurized is influenced by the difference between the redox potential for the charge carrier redox couple ($X^{i+}/X^{(i-j)+}$) and the hydrogen evolution potential in the first solution 3 and/or in the second solution 6 (the charge carrier redox couple differential). For instance, the second reactor 5 can have a pressure up to about 10 atmospheres for a charge carrier redox couple differential of about -60 mV, up to about 100 atmospheres for a charge carrier redox couple differential of about -120 mV, and up to about 1000 atmospheres for a charge carrier redox couple differential of about -180 mV. Accordingly, the second reactor 5 can have a pressure up to about $10^{(D/59mV)}$ where D represents the value of the charge carrier redox couple differential in mV. The charge carrier redox couple differential is about 180-200 mV for the charge carrier redox couple ($V^{3+}/V^{2+}$) where the hydrogen evolution potential is determined for a broad range of first solutions.

In the system disclosed in the context of FIG. 1 and FIG. 2, the first solution and/or the reduced charge carrier act as an intermediate in hydrogen generation. For instance, reducing the charge carrier effectively acts as charging the charge carrier with electrons to be used in a subsequent reduction of protons to hydrogen. As is evident from FIGS. 1 and 2 the primary inputs into the system are energy and water although the system may require occasional infusions of charge carrier and acid with passage of time. In some instances, the charge carrier reduction is performed in a solar fuels generator. The subsequent reduction of the protons to form the hydrogen gas does not require additional energy. Accordingly, the energy supplied to the system can be solar energy. As a result, the first solution and/or the reduced charge carrier act as an intermediate in solar fuel generation.

The systems disclosed in the context of FIG. 1 and FIG. 2 use transportation of materials and/or solutions between different components of the system. The transportation can be achieved using typical system component such as pipes, conduits, pumps, and any associated control electronics. Alternately, all or a portion of the transportation operations can be performed manually. For instance, solution(s) can be manually moved from one reactor to another using a vessel that holds the solution such as a beaker and flask.

Figure 3:
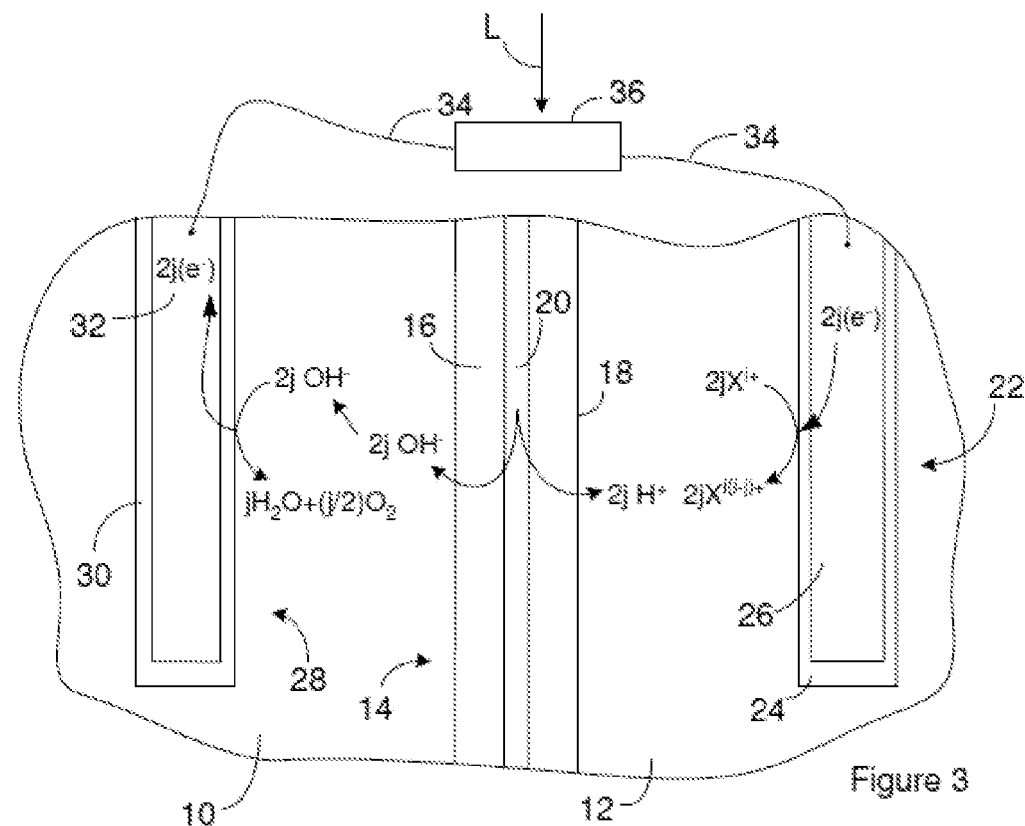
FIG. 3 illustrates the active portion of a first reactor.

FIG. 3 illustrates an example of a suitable first reactor 2 where solar energy can serve as the energy applied to the first reactor. The first reactor 2 includes an anolyte 10 and a catholyte 12 separated by a separator 14. The catholyte 12 serves as the first solution. The anolyte 10 and catholyte 12 each contacts the separator 14. The separator 14 can be a bipolar separator that includes an anion exchange membrane 16 and a cation exchange membrane 18 arranged such that a component cannot travel between the anolyte 10 and the catholyte 12 through the separator 14 without traveling through both the anion exchange membrane 16 and the cation exchange membrane 18. A cation exchange membrane 18 is cationically conductive with limited conductivity for nonionic atoms or nonionic compounds, and close to zero conductivity for anions. An anion exchange membrane 16 is anionically conductive with limited conductivity for nonionic atoms or nonionic compounds, and close to zero conductivity for cations. As a result, ions, nonionic atoms, and nonionic compounds from the anolyte 10 do not substantially travel across the separator 14 to the catholyte 12 and ions, nonionic atoms, and nonionic compounds from the catholyte 12 do not substantially travel across the separator 14 to the anolyte 10. Accordingly, protons do not readily travel between the anolyte 10 and the catholyte 12 allowing the anolyte 10 and catholyte 12 to be at substantially different pH levels.

A suitable pH for the anolyte includes a pH greater than or equal to −1, 0, or 6 and/or less than 15, 14, or 13. A suitable base for use in the anolyte includes, but is not limited to, KOH, NaOH, and/or CsOH. A suitable pH for the catholyte includes a pH greater than or equal to −1, 0, or 1 and/or less than 15, 14, or 3. A suitable acid for use in the catholyte includes, but is not limited to, $H_2SO_4$, HCl, KCl, and/or KOH. Suitable acids for use in the first solution include, but are not limited to, $H_2SO_4$, HCl, and $HNO_3$. In some instances, the anolyte has a pH greater than 6 and the catholyte has a pH less than 3.

FIG. 3 illustrates a catalyst layer 20 located between the anion exchange membrane 16 and the cation exchange membrane 18. The catalyst layer 20 is optional and the anion exchange membrane 16 can be in direct physical contact with the cation exchange membrane 18. For instance, the anion exchange membrane 16 can be laminated directly to the cation exchange membrane 18. When the separator 14 includes a catalyst layer 20, the catalyst layer 20 can include, consist of, or consist essentially of a catalyst such as a water dissociation catalyst or water self-ionization catalyst. Suitable water dissociation catalyst or water self-ionization catalysts include, but are not limited to, metal oxides and/or metal hydroxides such as TiOH, ZrOH, SiOH, polymeric materials such as poly(ferrocenyldimethysilane), poly(acrylamide), graphene and graphene oxides. Although FIG. 3 shows the catalyst included in a layer that is distinct from the anion exchange membrane 16 and the cation exchange membrane 18, the anion exchange membrane 16 and/or the cation exchange membrane 18 can include the catalyst. For instance, the catalyst can be embedded in the anion exchange membrane 16 and/or the cation exchange membrane 18. Alternately, the anion exchange membrane 16 and/or the cation exchange membrane 18 can be impregnated or implanted with the catalyst.

Suitable anion exchange membranes 16 for use in the separator 14 include, but are not limited to, polyaromatic polymers, fluorinated polymers functionalized with sulfonic acid groups. An example of a suitable fluorinated polymer functionalized with sulfonic acid groups is sold under the trademark NAFION®. Suitable cation exchange membranes 18 for use in the separator 14 include, but are not limited to, polymeric materials functionalized with quaternary ammonium groups. An example of a suitable polymer functionalized with quaternary ammonium groups is sold under the trademark SELEMION®.

A suitable thickness for the anion exchange membrane 16 includes, but is not limited to, a thickness greater than 1 μm, 5 μm, or 10 μm and/or less than 500 μm, 1000 μm. A suitable thickness for the cation exchange membrane 18 includes, but is not limited to, a thickness greater than 1 μm, 5 μm, or 10 μm and/or less than 500 μm, 1000 μm. A suitable thickness for the catalyst layer 20 includes, but is not limited to, a thickness greater than 1 nm, or 2 nm and/or less than 10 μm, or 100 μm.

The illustrated portion of the first reactor 2 includes a cathode 22 that contacts the catholyte 12. The cathode 22 can include an optional cathode catalyst layer 24 on a cathode conductor 26. The cathode catalyst layer 24 can include one or more cathode catalysts selected to catalyze the half reaction that occurs at the cathode 22. Although the one or more cathode catalysts are shown as being included in a cathode catalyst layer 24, the one or more cathode catalysts can be included in the cathode conductor 26. Suitable cathode catalysts include, but are not limited to, reduction catalysts. When the half reaction at the cathode 22 is charge carrier reduction, a suitable cathode catalyst includes, but is not limited to, carbon nanotubes, glassy carbon, carbon cloth, or mercury, and combinations thereof.

The illustrated portion of the first reactor 2 includes an anode 28 that contacts the anolyte 10. The anode 28 can include an optional anode catalyst layer 30 on an anode conductor 32. The anode catalyst layer 30 can include one or more anode catalysts selected to catalyze the half reaction that occurs at the anode 28. Although the one or more anode catalysts are shown as being included in an anode catalyst layer 30, the one or more anode catalysts can be included in the anode conductor 32. Suitable anode catalysts include, but are not limited to, oxidation catalysts. When the half reaction at the anode 28 is an oxygen evolution reaction (OER), a suitable anode catalyst includes, but is not limited to, FeNiOx, IrOx, RuOx, CoOx and combinations thereof.

One or more electrical conductors 34 provide electrical communication between the anode 28 and the cathode 22. Suitable electrical conductors include, but are not limited to, metal wires, conductive polymers, conductive pastes and combinations thereof. An electrical pathway includes the anode 28, the one or more electrical conductors 34 and the cathode 22. FIG. 3 illustrates an external bias source 36 positioned along the electrical pathway so as to apply a bias between the cathode 22 and the anode 28. Suitable external bias sources 36 include, but are not limited to, batteries, fuel cells, and grid electricity. In some instances, the external bias source 36 is a photoelectrode that converts incident light into excited electron-hole pairs that drive a chemical reaction.

Suitable anode conductors 32 include, but are not limited to, metals, metal alloys, metal phosphide and metal oxides such as Ni, Cu, Cu/Au, NiPx, CoPx, CoOx, and NiFeOx. Suitable cathode conductors 26 include, but are not limited to, carbon, metals and metal oxides such as metals, metal alloys, metal phosphide and metal oxides such as Ni, Cu, Cu/Au, NiPx, CoPx, CoOx, NiFeOx. When the external bias source 36 is or includes a photoelectrode, the photoelectrode includes a light absorber selected to absorb light at a wavelength to which the photocathode 22 will be exposed during operation of the first reactor.

The following discussion describes operation of a first reactor constructed as shown in FIG. 3. For the purposes of this discussion, the external bias source 36 is a photoelectrode. During operation of the first reactor 2, the external bias source 36 is illuminated as shown by the arrow labeled L in FIG. 3. The photoelectrode in the external bias source 36 absorbs at least a portion of the incident light. The absorption of light within the photoelectrode excites hole-electron pairs. The photo-excited electrons and holes produce an electrical field that causes the holes to move along the electrical pathway to the surface of the anode 28 and causes the electrons to move along the electrical pathway to the surface of the cathode 22. The electrons at the surface of the cathode 22 reduce the charge carriers ($X^{i+}$) in the catholyte 12 to form the reduced charge carrier ($X^{(i-j)+}$) in a first solution (catholyte 12).

The anion exchange membrane 16 and/or cation exchange membrane 18 can be constructed with sufficient permeability for water to be present between or at an interface of the anion exchange membrane 16 and cation exchange membrane 18. An electrical potential between or at the interface of the anion exchange membrane 16 and cation exchange membrane 18 causes water to dissociate between or at the interface of the anion exchange membrane 16 and the cation exchange membrane 18. For instance, the water can dissociate where the anion exchange membrane 16 contacts the cation exchange membrane 18 or in the catalyst layer between the anion exchange membrane 16 and cation exchange membrane 18.

The water dissociation within the separator 14 generates hydroxide anions and protons in the interface of the anion exchange membrane 16 and the cation exchange membrane 18 and/or between the interface of the anion exchange membrane 16 and cation exchange membrane 18. The anion exchange membrane 16 is on the anolyte 10 side of the separator 14. As a result, the hydroxide anions travel through the anion exchange membrane 16 to the anolyte 10 without traveling through the cation exchange membrane 18 as shown in FIG. 3. The hydroxide anions enter the anolyte 10 and are oxidized by the holes at the surface of the anode 28 to form water and oxygen as shown in FIG. 3. As a result, the hydroxide anions do not substantially change the pH of the anolyte 10 during operation of the first reactor 2.

The cation exchange membrane 18 is on the catholyte 12 side of the separator 14. As a result, the protons generated by the water dissociation travel through the cation exchange membrane 18 to the catholyte 12 without traveling through the anion exchange membrane 16 as shown in FIG. 3. The protons enter the catholyte 12. When the catholyte 12 is at lower pH levels, a high concentration of protons is already present in the catholyte 12. As a result, the protons generated in the catholyte from disassociation of water in the separator can reduce the pH of the catholyte but do not substantially affect the pH of the catholyte.

FIG. 3 shows that a molar ratio of reduced charge carrier: water disassociation protons is 1:1 or about 1:1 in the catholyte. When the reduced charge carrier reduces the protons to form hydrogen according to reaction 1: $2H^+ + 2V^{2+} \rightarrow H_2(g) + 2V^{3+}$; the protons and the reduced charge carrier are consumed at a ratio of 1:1 or about 1:1. This arrangement allows the water disassociation protons to effectively replace the protons consumed by the subsequent proton reduction. The protons that are actually consumed by the proton reduction can come from the acid in the catholyte (first solution) and/or from the water disassociation. As a result, water can serve as the source of electrons for reducing the charge carrier and also as the source of protons for the proton reduction and/or to replace the protons consumed by proton reduction.

Suitable charge carriers for use in a first reactor having an active region constructed as shown in FIG. 3 have a redox potential that is more negative than HER and after reduction can regenerate $H_2$ upon exposure to a catalyst such as $Mo_2C$ for $V2^+$. Examples of suitable charge carriers for use in a first reactor having an active region constructed as shown in FIG. 3 include, but are not limited to, $V^{3+}$, Zn2+, and Cr3+.

Figure 4A:
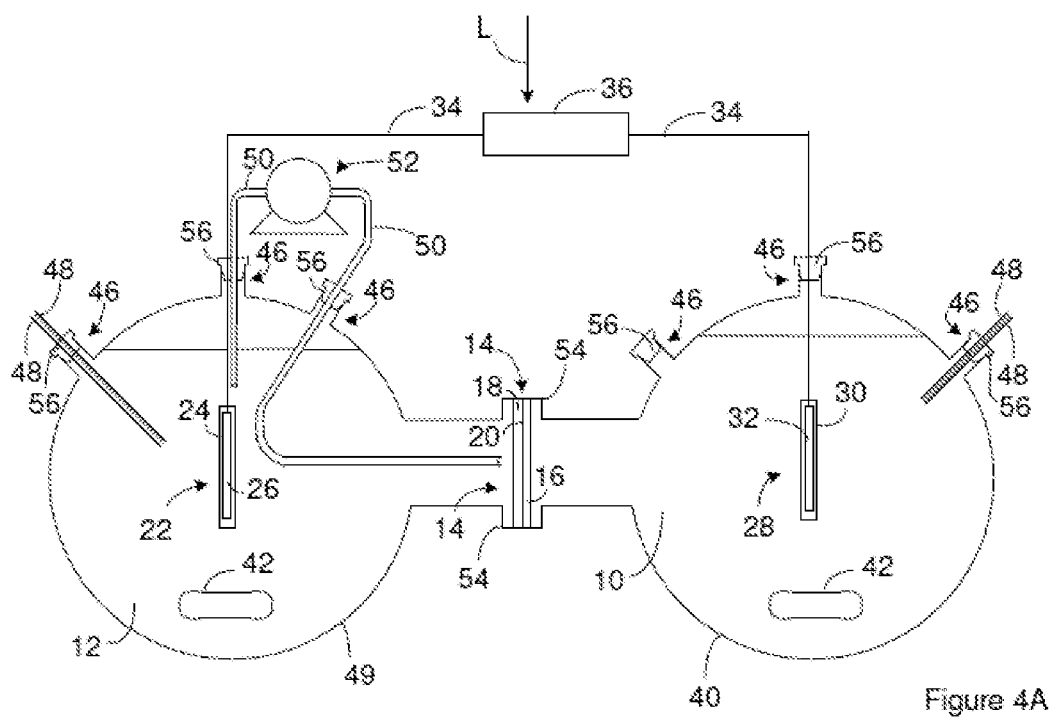
FIG. 4A is a cross-section of a solar fuels generator having an active portion constructed according to FIG. 3.

FIG. 4A illustrates a solar fuels generator that can serve as the first reactor. The first reactor has an active portion constructed according to version FIG. 3. The first reactor includes an anolyte reservoir 40 that acts as a reactor for the half reaction at the anode 28. The anolyte reservoir 40 contains the anode 28, an anolyte 10, and an agitation mechanism 42 such as a stir bar. During operation of the first reactor, the agitation mechanism 42 can be used to agitate and/or mix the components of the anolyte 10. The anolyte reservoir 40 includes three other utility ports 46 that provide a pathway into the interior of the anolyte reservoir 40. Each of the utility ports 46 is sealed such that the contents of the anolyte reservoir 40 are not exposed to the ambient atmosphere. Suitable methods of sealing the utility ports 46 include, but are not limited to, conventional sealing devices 56 such as rubber stoppers. One or more conduits 48 extend through one of the sealing devices 56 into the interior of the anolyte reservoir 40. The one or more conduits 48 can be used to collect and/or analyze the anolyte 10 and/or the gas above the anolyte 10. One of the utility ports 46 is sealed. The electrical conductor 34 extends through another one of the sealing devices 56 and is electrically connected to the anode 28.

The first reactor includes a catholyte reservoir 49 that acts as a reactor for the half reaction at the cathode 22. The catholyte reservoir 49 contains a cathode 22 that is not photoactive, a catholyte 12, and an agitation mechanism 42 such as a stir bar. The catholyte reservoir 49 includes three utility ports 46 that each provides a pathway into the interior of the anolyte reservoir 40. Each of the utility ports 46 is sealed such that the contents of the anolyte reservoir 40 are exposed to the ambient atmosphere. Suitable methods of sealing the utility ports 46 include, but are not limited to, conventional sealing devices 56 such as rubber stoppers. One or more conduits 48 extend through one of the sealing devices 56 into the interior of the anolyte reservoir 40. The conduits 48 can be used to collect and/or analyze the catholyte 12 and/or gas above the catholyte 12. The electrical conductor 34 extends through one of the sealing devices 56 and is electrically connected to the cathode 22.

The catholyte reservoir 49 includes a re-circulation system. The re-circulation system includes two or more re-circulation conduits 50 arranged such that at least two of the re-circulation conduits 50 extend through one or more of the utility ports 46 on the catholyte reservoir 49. For instance, FIG. 4A shows two of the re-circulation conduits 50 that each extends through a different one of the utility ports 46. The re-circulation conduits 50 are in liquid communication with a pump 52. The pump 52 can be used to re-circulate the catholyte 12 from the catholyte reservoir 49 back into the catholyte reservoir 49. An end of one or more fluid conduits 48 can be placed near a surface of an electrode and/or a surface of a separator 14. For instance, FIG. 4A illustrates an end of a fluid conduit 48 placed near the surface of the separator 14. The location of the end of the fluid conduit 48 near a surface can reduce formation and/or retention of gas bubbles on the surface. For instance, a flow of the catholyte 12 onto and/or across the surface of the separator 14 can remove gas bubbles from the surface of the separator 14 through mechanisms such as forced convective flux.

The catholyte reservoir 49 and the anolyte reservoir 40 each includes a separator port 54. The separator 14 is held between the separator port 54 of the catholyte reservoir 49 and the separator port 54 of the anolyte reservoir 40 such that the anolyte 10 and the catholyte 12 are each in contact with the separator 14.

Although FIG. 4A illustrates the re-circulation system operating with the catholyte reservoir 49, a re-circulation system can be used with the anolyte reservoir. The first reactor can include more than one re-circulation system. For instance, a first re-circulation system can be used with the catholyte reservoir 49 and a second re-circulation system can be used with the anolyte reservoir. Alternately, both the catholyte reservoir 49 and anolyte reservoir can exclude a re-circulation system.

Figure 4B:
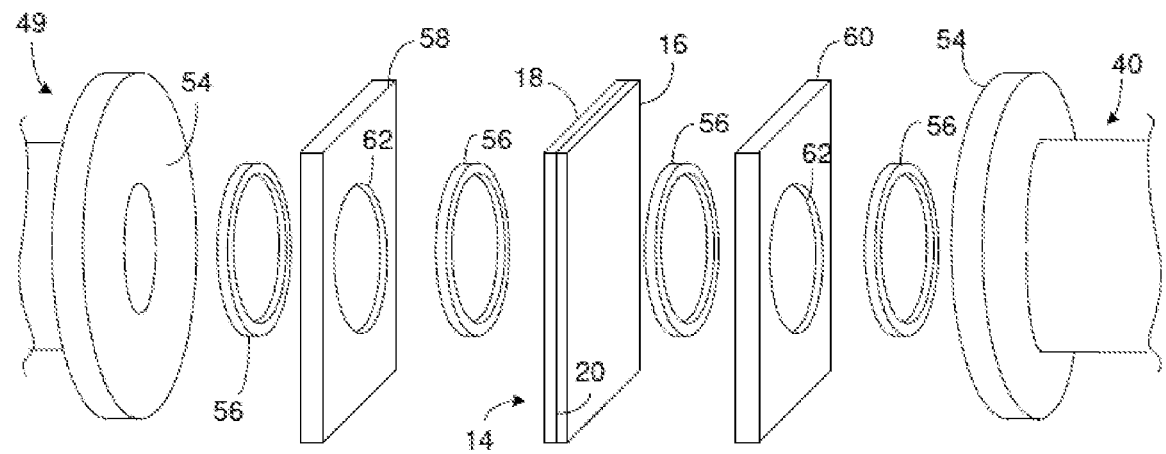
FIG. 4B is a perspective drawing of an exploded view of an interface between a separator, cathode and anode that is suitable for use in the first reactor of FIG. 4A.

In FIG. 4A, the interface between the separator 14, the catholyte reservoir 49 and the anolyte reservoir 40 is constructed such that the separator 14, the anolyte 10, and the catholyte 12 are not exposed to the ambient atmosphere. For instance, FIG. 4B illustrates one possible construction of the interface between the separator 14, the catholyte reservoir 49 and the anolyte reservoir 40. The interface includes multiple sealing devices 56 such as o-rings located between different interface components. For instance, a sealing device 56 is located between a flange of the catholyte reservoir 49 and a first separator support 58. A sealing member is also between the first separator support 58 and the separator 14. Another sealing member is between the separator 14 and a second separator support 60. Another sealing member is also between the second separator support 60 and a flange of the anolyte reservoir 40. Suitable second separator supports 60 and first separator supports 58 include but are not limited to, metal substrates, rubber, Teflon, and glass.

The interface is formed by clamping the flange of the anolyte reservoir 40 to the flange of the catholyte reservoir 49 with the components of the interface between the flange of the anolyte reservoir 40 and the flange of the catholyte reservoir 49. When the interface is assembled, the separator 14 is located between the first separator support 58 and the second separator support 60. An opening 62 extends through the first separator support 58 and the anolyte 10 can contact the separator 14 through the opening 62 in the first separator support 58. An opening 62 extends through the second separator support 60 and the catholyte 12 can contact the separator 14 through the opening 62 in the second separator support 60.

Figure 5A:
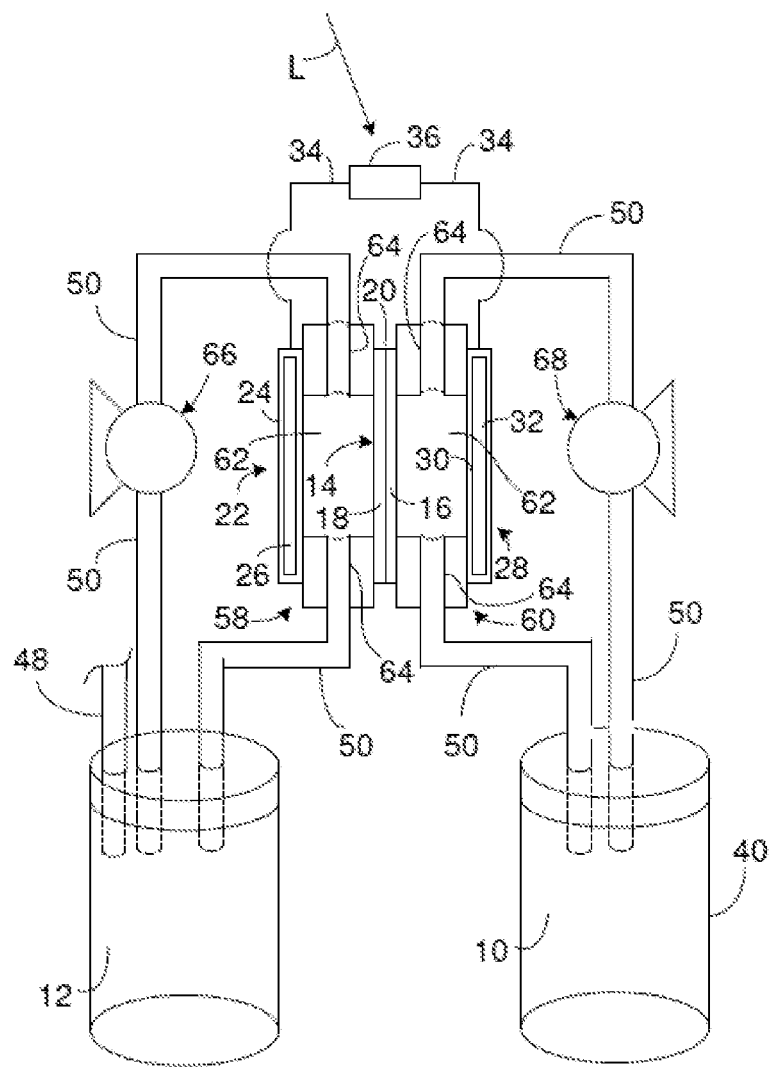
FIG. 5A is a cross-section of a solar fuels generator having an active portion constructed according to FIG. 3.

FIG. 5A illustrates another embodiment of a first reactor having an active portion constructed according to FIG. 3. In this embodiment, the interface between the separator 14, the catholyte reservoir 49 and the anolyte reservoir 40 are moved outside of the reservoirs. For instance, rather than the interface being clamped between the reservoirs, the electrodes are moved outside of the interface and over the openings 62 in the separator supports 58. More particularly, the anode 28 is positioned over the opening 62 through the first separator support 58 and the cathode 22 is positioned over the opening 62 through the second separator support 60.

Lumens 64 extend through the first separator support 58 to the opening 62 through the first separator support 58. A cathode 22 re-circulation system includes a catholyte pump 66 and fluid conduits 48 that are configured to re-circulate the catholyte 12 from a catholyte reservoir 49, through one of the lumens 64 into the opening 62 in the first separator support 58, out another of the lumens 64 and back to the catholyte reservoir 49. During operation of the first reactor, the catholyte 12 contacts the separator 14 and the cathode 22 when passing through the opening 62 in the first separator support 58. Accordingly, the opening 62 in the first separator support 58 effectively serves as a reactor for the half reaction at the cathode 22.

Lumens 64 extend through the second separator support 60 to the opening 62 through the second separator support 60. An anode 28 re-circulation system includes an anolyte pump 68 and fluid conduits 48 that are configured to re-circulate the anolyte 10 from an anolyte reservoir, through one of the lumens 64 into the opening 62 in the second separator support 60, out another of the lumens 64 and back to the anolyte reservoir. During operation of the first reactor, the anolyte 10 contacts the separator 14 and the anode 28 when passing through the opening 62 in the second separator support 60. Accordingly, the opening 62 in the first separator support 58 effectively serves as a reactor for the half reaction at the anode 28.

One or more conduits 48 extend through the catholyte reservoir 49 into the interior of the catholyte reservoir 49. The conduits 48 can be used to collect and/or analyze the catholyte 12 and/or gas above the catholyte 12.

Figure 5B:
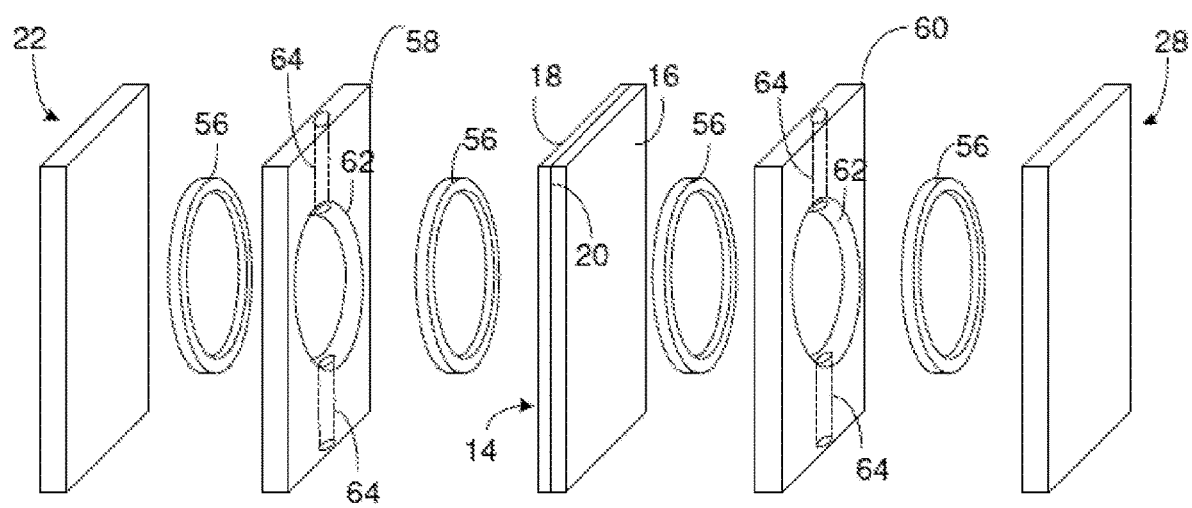
FIG. 5B is a perspective drawing of an exploded view of an interface between a separator, cathode and anode that is suitable for use in the first reactor of FIG. 5A.

FIG. 5B illustrates a possible construction of the interface between the separator 14, cathode 22 and the anode 28 as shown in FIG. 5A. The interface includes multiple sealing devices 56 such as o-rings located between different interface components. For instance, a sealing device 56 is located between the cathode 22 and a first separator support 58. A sealing member is also between the first separator support 58 and the separator 14. Another sealing member is between the separator 14 and a second separator support 60. Another sealing member is also between the second separator support 60 and the anode 28. The interface is formed by clamping the components of the interface together. When the interface is assembled, the separator 14 is located between the first separator support 58 and the second separator support 60.

EXAMPLES

Example 1

A first reactor constructed according to FIG. 3 was used to generate a first solution. A carbon fiber cloth with a geometric area of 6.0 cm$^2$ (FuelCellsEtc) was used as the cathode 22 and nickel mesh with a geometric area of 6.0 cm$^2$ (Sigma Aldrich) was used as the anode 28. The charge carrier was V$^{3+}$ and the reduced charge carrier was V$^{2+}$. The catholyte was 2.0 M H$_2$SO$_4$ (pH=−0.16) with an initial [V$^{3+}$]=0.36 M. The catholyte was prepared from VOSO$_4$-x H$_2$O (97%, x=3.41, Sigma-Aldrich) in 2.0 M H$_2$SO$_4$ by diluting ultrapure, concentrated sulfuric acid H$_2$SO$_4$ (93-98%, J. T. Baker) in ultrapure water (18.2 MΩ cm). The 0.36 M V$_2$(SO$_4$)$_3$ 2.0 M H$_2$SO$_4$ was obtained by reducing V(IV) to V(II), followed by oxidizing V(II) to V(III) by bubbling with oxygen (O$_2$, Air Liquide) for at least 30 minutes. The catholyte was deoxygenated in the catholyte reservoir 49 for at least 10 minutes with in-house nitrogen (N$_2$) before the charging process. The anolyte was 2.5 M KOH (pH=14.21, >=85%, Macron). A bipolar separator was used to sustain the pH differentials between the anode and the cathode and to provide the necessary ionic transport between the cathode and anode chamber.

Figure 6:
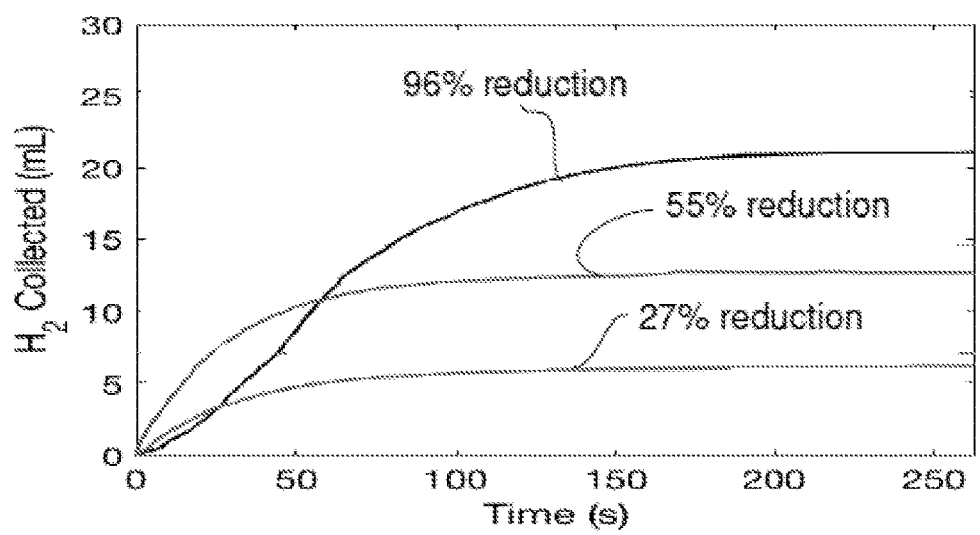
FIG. 6 illustrates the amount of hydrogen gas collected from the first reactor over time as a result of a parasitic Hydrogen Evolution Reaction (HER) in the first reactor.

The first reactor was operated by applying of −730 mV, −830 mV, and −1000 mV vs. SCE between the cathode and the anode. FIG. 6 shows the collected H$_2$(g) as a function of the charge passed. The production of hydrogen gas in the first reactor is a parasitic reaction that is suppressed by the use of the carbon fiber cloth cathode due to slow reaction kinetics for HER. Negligible hydrogen was produced while reducing the charge carrier in 50.0 mL of the anolyte before reaching the capacity of the charge carrier reduction (100% reduction of the charge carrier to the reduced charge carrier). After the vanadium charge carrier reached its reduction capacity, a rapid switch to H$_2$(g) production was observed for each of the applied potentials. Near unity Faradaic efficiency for vanadium reduction was achieved when an overpotential of 331 mV or an applied potential of −830 mV vs. SCE was applied between the cathode and the anode.

Example 2

A triple junction photovoltaic cell was attached to the first reactor of Example 1 as the external bias source 36 of FIG. 4A. The resulting first reactor was tested outdoors. For the first ~4.5 hours, the system photo-current density fluctuated around 12 mA cm$^{-2}$, while the illumination intensity fluctuated around 95 mW cm$^{-2}$. Fluctuations in the photo-current matched corresponding fluctuations in illumination intensity from environmental factors. Between 14:17 and 15:47, a wind-blown tree caused extreme variability in illumination intensity in the range of ~5 to 95 mW cm$^{-2}$, corresponding to variable photo-current densities from 0.8 to 11.6 mA cm$^{-2}$. Cloud-cover between 16:45 to 17:00 caused illumination intensity to drop to ~5 mW cm$^2$ and photo-current density to drop to ~0.8 mA cm$^2$. After 17:17 a building blocked the photovoltaic cell from the sun, and illumination intensity to drop below 3 mW/cm$^2$, while the current density dropped below 0.5 mA/cm$^2$. After the charge carrier was reduced to 85% of the total reduction capacity, 50 mL of catholyte was contacted with Mo$_2$C in a second reactor to produce H$_2$ (g) at 80% efficiency (i.e. 80% of the V$^{2+}$ oxidized back to the V$^{3+}$).

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A solar fuels generation system consisting of a first reactor and a second reactor:
    the first reactor comprising:
        a catholyte solution comprising water, an acid and a charge carrier,
        an anolyte solution,
        a cathode comprising a material selected from the group consisting of carbon nanotubes, glassy carbon, carbon cloth, mercury and any combination thereof, and
        an anode comprising a material selected from the group consisting of FeNiOx, RuOx, CoOx and any combination thereof;
        wherein the cathode and anode are separated by a bipolar membrane,
        wherein the catholyte and anolyte have different pHs,
        wherein the anolyte is in contact with the anode and the catholyte is in contact with the cathode, and
        wherein the charge carrier is reduced to a reduced charge carrier; and
    the second reactor comprising a molybdenum carbide or Pt catalyst that contains a solution in which the reduced charge carrier from the catholyte solution reduces protons so as to generate hydrogen gas by a chemical reaction having a hydrogen evolution potential of 50 mV to 400 mV and wherein the second reactor is pressurized to $10^{(D/59mV)}$ atmospheres, wherein D is the value of the charge carrier redox couple differential in mV.

2. The system of claim 1, wherein the charge carrier is a vanadium cation.

3. The system of claim 1, wherein the charge carrier is represented by X$^{i+}$ wherein X represents an atom or a compound, i+ represents the charge of X where i is an integer and is greater than or equal to 1 and less than or equal to 5.

4. The system of claim 3, wherein the reduced charge carrier is represented by X$^{(i-j)+}$ wherein j is an integer and can be 1, 2, 3, or 4 and (i−j) is greater than 0.

5. The system of claim 4, wherein X represents vanadium, i is 3 and j is 1.

6. The system of claim 5, wherein the pH of the catholyte solution is less than 1.

7. The system of claim 1, wherein the charge carrier and the reduced charge carrier are a redox couple and a redox potential for the redox couple is less than a hydrogen evolution potential for evolving the hydrogen gas in the first solution.

8. The system of claim 1, wherein disassociation of water in the first reactor is a source of protons that enter the catholyte solution during the reduction of the charge carrier.

9. The system of claim 8, wherein the disassociation of the water occurs in the bipolar membrane.

10. The system of claim 1, further comprising a bias source that includes one or more components selected from a photoelectrode, a solar cell, and a photovoltaic cell, and
    wherein electrons that reduce the charge carrier in the first reactor are excited by light being absorbed by the bias source.

11. The system of claim 1, wherein the first reactor is a solar fuels generator.

12. The system of claim 1, wherein the second reactor is pressurized to more than 100 bar during the generation of the hydrogen gas.

13. The system of claim 1, wherein the reduced charge carrier is oxidized back to the charge carrier during the reduction of the protons by the reduced charge carrier in the second reactor.

14. The system of claim 1, further comprising:
    a storage tank in which the catholyte solution is stored between being transported from the first reactor and being transported into the second reactor.

15. A solar fuel intermediate generator, comprising:
    a bias source that includes one or more components selected from a photoelectrode, a solar cell, and a photovoltaic cell;
    a catholyte in which a charge carrier is reduced to a reduced charge carrier by electrons excited by absorption of light by the bias source;
    the charge carrier and the reduced charge carrier being a redox couple and a redox potential for the redox couple being more negative than a hydrogen evolution potential for the reduced charge carrier reducing protons to hydrogen gas in the catholyte;
    a reactor comprising a bipolar separator between the catholyte and an anolyte comprising an anion exchange membrane and a cation exchange membrane; and
    an anode in the reactor comprising a material selected from the group consisting of FeNiOx, RuOx, CoOx and any combination thereof, wherein the anolyte is in contact with the anode;
    wherein disassociation of water is a source of protons that enter the catholyte during the reduction of the charge carrier and the disassociation of the water occurs in the bipolar separator between the catholyte and an anolyte, and
    wherein the catholyte and anolyte have different pHs.

16. The solar fuel generator of claim 15, wherein the charge carrier and the reduced charge carrier are vanadium cations.

17. The system of claim 9, wherein the bipolar membrane further comprises a catalyst layer between an anion exchange membrane and a cation exchange membrane of the bipolar membrane.

* * * * *